April 18, 1950   J. LEDWINKA ET AL   2,504,933
UNDERFRAME, ESPECIALLY FOR RAILCARS
Filed March 2, 1945   5 Sheets-Sheet 1
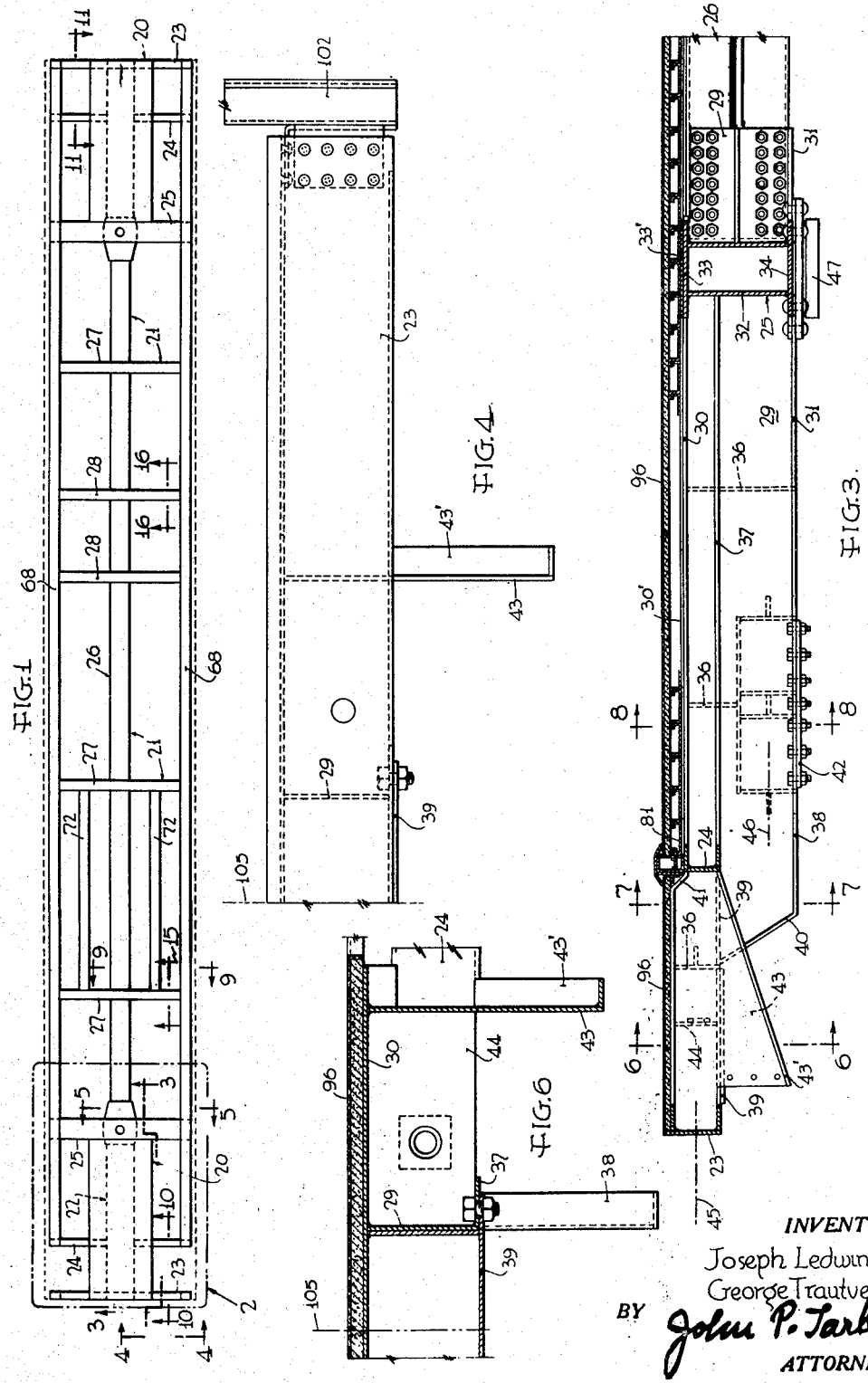
INVENTORS
Joseph Ledwinka
George Trautvetter
BY John P. Tarbot
ATTORNEY

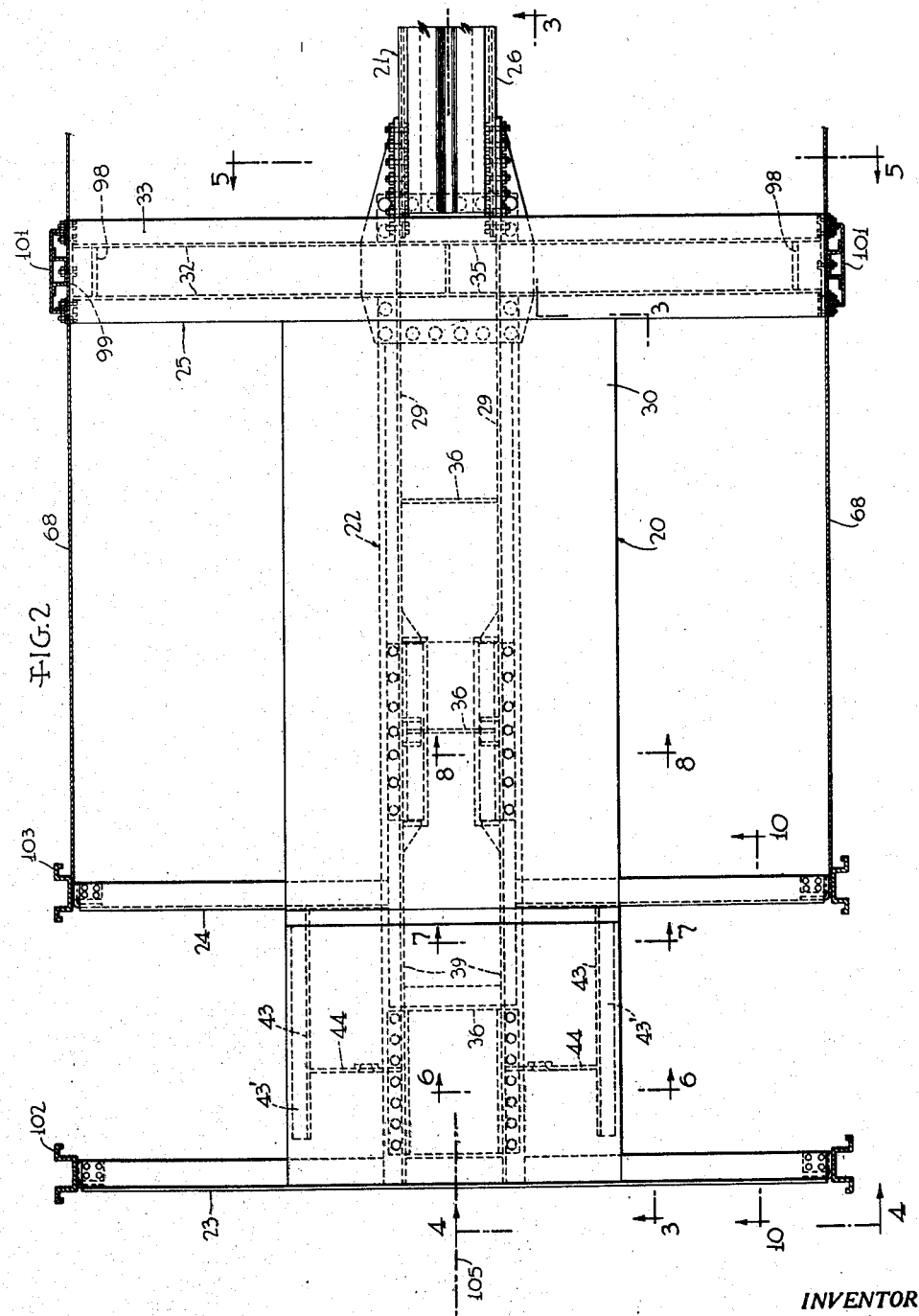

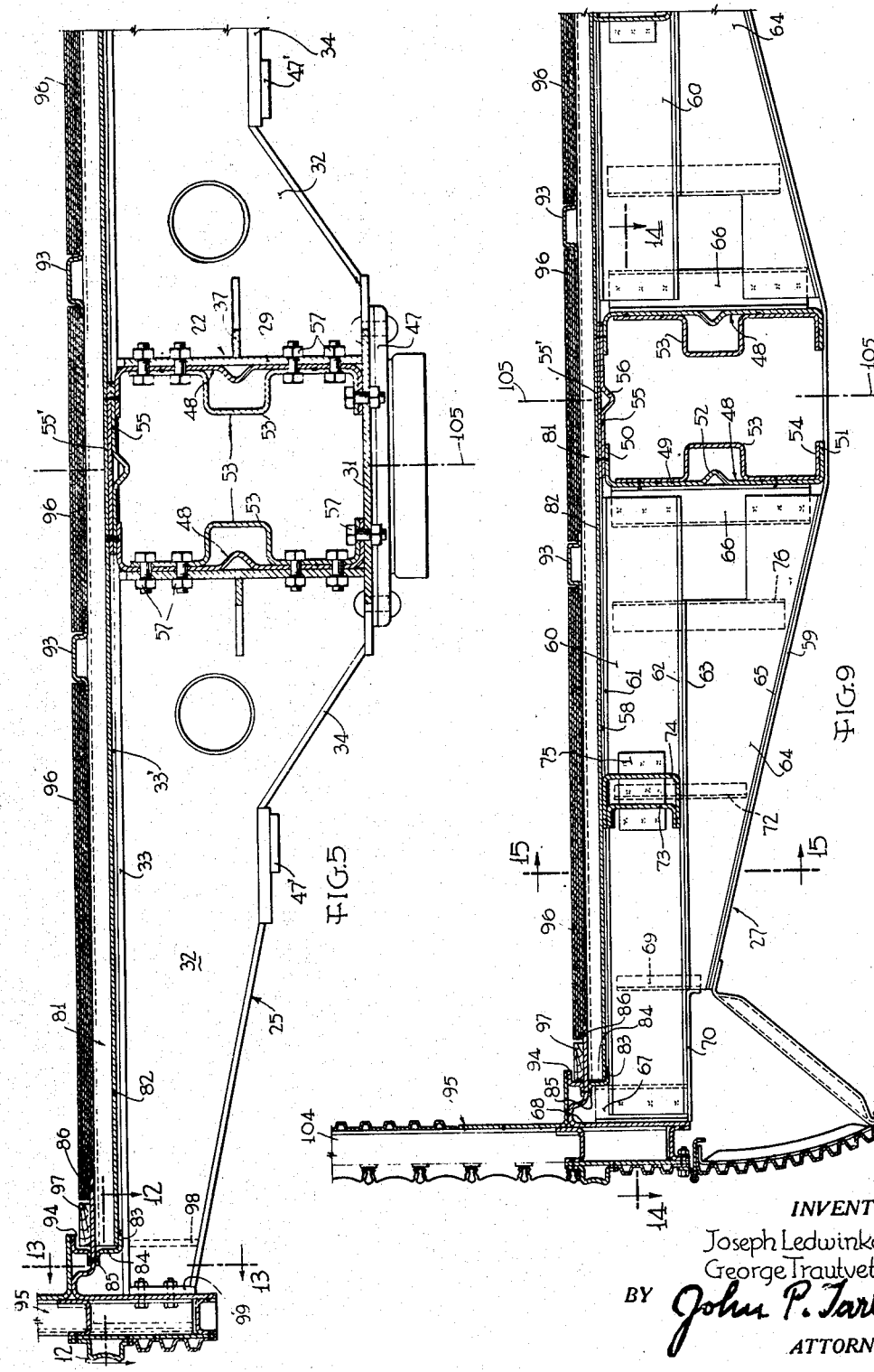

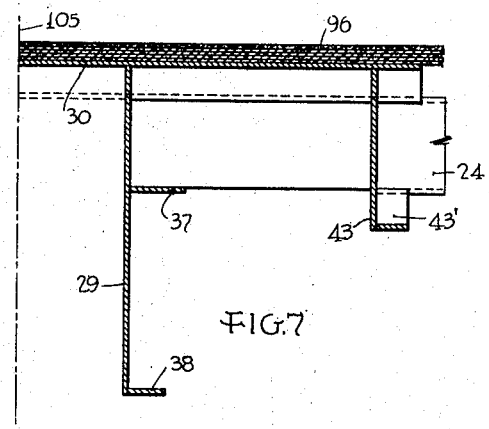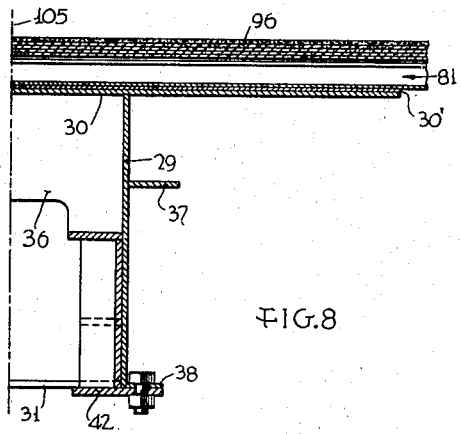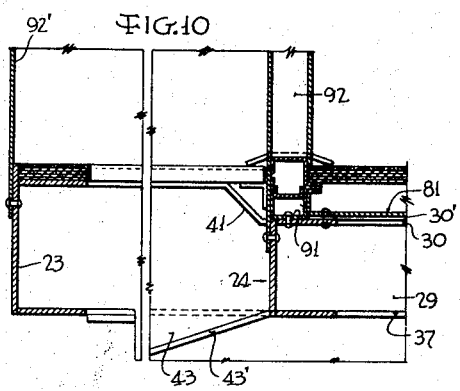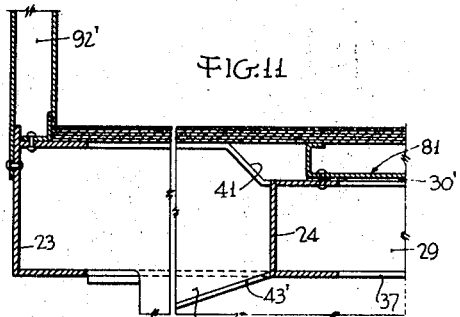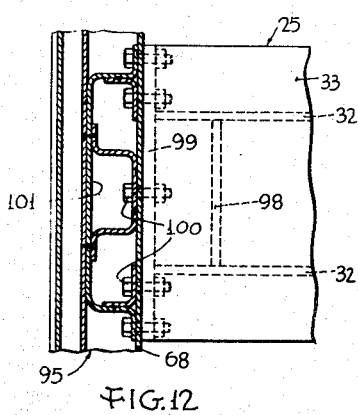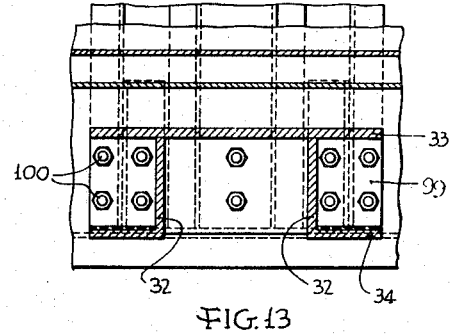

April 18, 1950  J. LEDWINKA ET AL  2,504,933
UNDERFRAME, ESPECIALLY FOR RAILCARS
Filed March 2, 1945  5 Sheets-Sheet 5
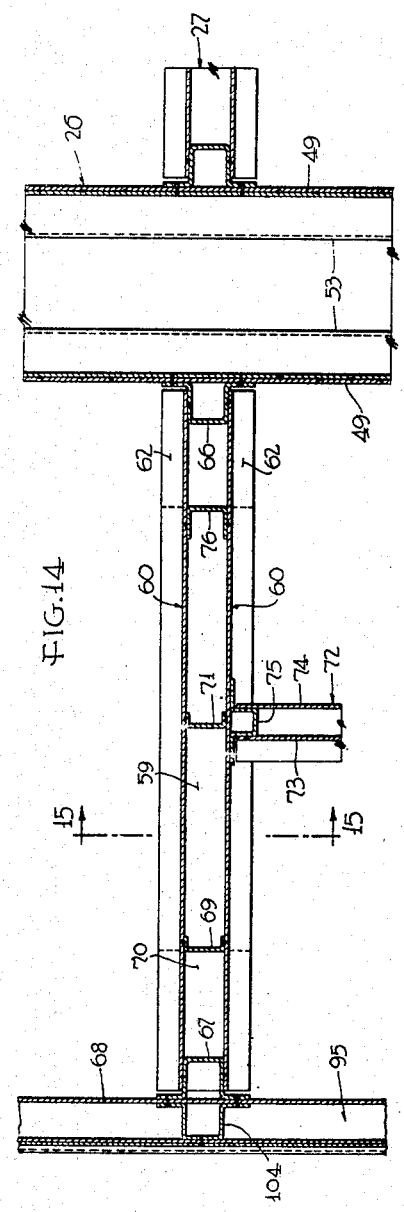
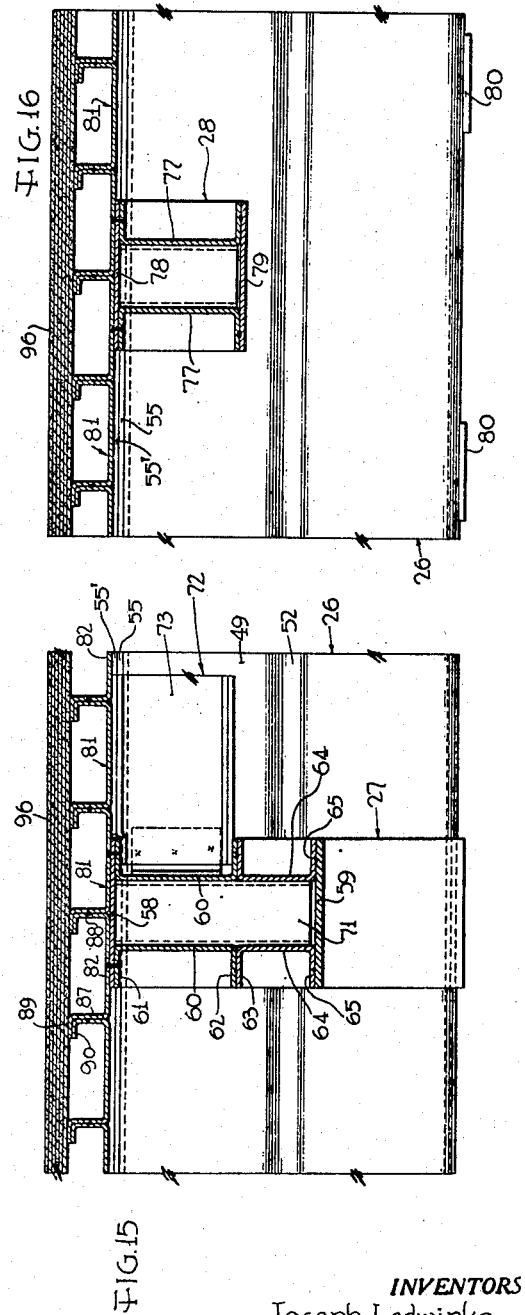
INVENTORS
Joseph Ledwinka
George Trautvetter
BY John P. Tarbox
ATTORNEY Patented Apr. 18, 1950

2,504,933

UNITED STATES PATENT OFFICE 2,504,933

UNDERFRAME, ESPECIALLY FOR RAIL CARS

Joseph Ledwinka, Philadelphia, and George Trautvetter, Jenkintown, Pa., assignors to The Budd Company, Philadelphia, Pa., a corporation of Pennsylvania Application March 2, 1945, Serial No. 580,645

10 Claims. (Cl. 105—414)

1

The invention relates to an underframe for vehicles especially railcars. More particularly the invention relates to an underframe unit adapted to be used in connection with the invention disclosed in applicants' application, Serial No. 572,774, filed January 15, 1945, for "Vehicle body, especially for rail cars."

Among the objects of the invention is an underframe which combines great strength with light weight, which lends itself to fabrication of high strength material, especially high tensile stainless steel, which may be assembled as a unit, which lends itself to easy connection with adjoining units such as side wall and end wall units, and which is adapted for the secure support of accessories such as batteries and air conditioning equipment.

The aforesaid and other objects and advantages of the invention as well as its features will be more easily understood from the illustration of an embodiment in the attached drawing and from the following detailed description thereof.

In the drawing:

Figure 1 is a small scale plan view of an underframe unit built in accordance with the invention;

Figure 2 is a plan view on a larger scale of the left hand part of the underframe surrounded by the dot-and-dash line 2 in Figure 1, the floor being omitted in Figures 1 and 2 so as to show more clearly the main framework;

Figure 3 is a side elevation of the structure shown in Figure 2 partly in section along line 3—3 of Figures 1 and 2;

Figures 4 to 9 are transverse sections and end elevations respectively along the correspondingly numbered lines of Figures 1, 2 and 3;

Figures 10 and 11 are longitudinal sections along the correspondingly numbered lines of Figures 1 and 2 through the end cross members and floor structure respectively at the left hand and right hand ends of the car;

Figure 12 is a fragmentary large scale plan view of one end of the bolster beam and its connection to the side wall unit which latter is shown in section substantially along line 12—12 of Figure 5;

Figure 13 is a sectional view substantially along line 13—13 of Figure 5;

Figure 14 is a fragmentary large scale horizontal section through the needle beam substantially along line 14—14 of Figure 9;

Figure 15 is a vertical section through the needle beam and the floor structure substantially along lines 15—15 of Figures 1, 9 and 14; and Figure 16 is a section through one of the transverse beams substantially along line 16—16 of Figure 1.

The underframe shown in the drawing has a skeleton framework, the main elements of which are an end underframe 20 at each end and a central body underframe structure 21. Each end underframe 20 has a center sill portion 22, a transverse end beam 23, an intermediate transverse beam 24 and a bolster beam 25. The central body underframe comprises a body center sill 26, a number of needle beams 27 and other transverse beams 28. The floor structure and the side sills which form main members of the underframe structure will be described later on.

The center sill 22 and the bolster beam 25 of each end underframe are of closed box sectional construction having respectively vertical walls and top and bottom plates 29, 30, 31 and 32, 33, 34, the vertical walls 32 of the bolster beam 25 being continued by shear webs 35 in the interior of the center sill portion 22.

The center sill portion 22 of the end underframe is additionally reinforced by interior bulkheads 36 horizontally spaced marginal flanges 37 and 38 and in the extreme end region by an intermediate bottom wall 39. The lower margins of the center sill portion 22 are upwardly offset in the end regions at 40 and the upper margin of the sill is slightly offset at 41. The main bottom plate 31 ends in rear of the location for the draft gear (not shown) which is housed in the interior of the center sill in the region of the removable bottom plates 42. Longitudinal gusset plates 43, which are laterally spaced from the vertical walls 29 and secured to the intermediate sill 24, the top plate 30 and, by transverse webs 44 to the vertical walls 29, serve for the attachment of a buffer sill and coupler suspension structure (not shown). The plates 43 are reinforced by marginal flanges 43'.

As indicated in the drawing, the center sill and the transverse beams of the end underframes are additionally reinforced by plates and brackets at locations which are stressed by the attachment of the (not shown) draft gear, diaphragm suspension, the buffer, etc.

The end beam 23 and the intermediate beam 24 are of inboard facing channel-section having their top walls at the level of the top wall 30 of the center sill and their lower walls at the level of the flanges 37. The end sill or beam 23 extends all the way across the underframe whereas the intermediate beam 24 consists of two sections, each ending at the center sill portion 22.

The center line of the buffer and the center line of the draft gear or coupler are indicated respectively by the lines 45 and 46. Both lines are well within the cross section of the center sill portion 22, inboard of the offsets 40, 41. A center bearing 47 is secured such as by rivets to the underframe at the intersection of the center sill portion 22 and the bolster beam 25. 47' are side bearings. The top plate of the center sill portion ends with the rear margin of the top plate 33 of the bolster beam so that the inboard end of the center sill portion presents a box open at the top and the inboard end is adapted for the reception of the adjacent end of the body center sill 26 presently to be described.

The end underframe is preferably made of a plurality of steel plates connected with each other along their meeting lines by fusion welding such as electric arc welding.

The body center sill 26 is of box-sectional construction which may, however, be partly open at the bottom. The height of this sill is substantially equal to the height of the center sill portion 22 of the end underframes inboard of the offsets 40, 41. The sill 26 comprises two inwardly facing channel-sections 48 having a vertically arranged bottom wall 49 and top flange 50 and bottom flange 51 and an inwardly directed central reinforcing bead 52. The side walls 48 are interiorly reinforced each by a hat-section 53, i. e., a channel- or U-section having marginal outwardly directed flanges. The open side of this section faces and has its flanges secured to the respective web 49. The lower flange of the hat-section 53 is continued by an inwardly directed flange 54 which overlaps and is secured to the bottom flange 51 of the outer sill wall 48. The top flanges 50 of the side walls 48 are overlapped and interconnected by a top plate or strip 55 which is also reinforced by an inwardly directed longitudinal central bead 56.

The center sill as so far described is preferably made of high tensile sheet material such as cold rolled austenitic stainless steel and its parts are brought into the illustrated shape by form-rolling or roller drawing and are interconnected in the overlapping regions preferably by electric spot or seam welding.

The decrease of strength incident to the opening at the bottom of the center sill is partly compensated for by the double flange structures 51, 54 and, moreover, by cross members, some of which will be described in the following, interconnecting the opposite flanges. The opening at the bottom of the center sill has the great advantage that it renders the interior of the sill accessible for inspection and permits the installation of piping, wiring, et cetera in the interior of the sill.

The outboard ends of the body center sill 26 and the center sill portions 22 of the end underframes telescope for an appropriate distance and are rigidly connected such as by bolts 57 as clearly shown in Figures 3 and 5.

The needle beams 27 are of closed box-sectional construction comprising a top plate 58 and a bottom plate 59, both of which extend across the center sill 26 and are secured, respectively, to the top and the bottom of the center sill 26. On each side of the center sill 26 the needle beam has two longitudinally spaced upper channel section members 60 which have their top flanges 61 secured to the underside of the top plate 58. The bottom flanges 62 of the members 60 are overlapped by and secured to the top flanges 63 of a second pair of U-sectional members 64 which decrease in height from the center sill 26 toward the outer side of the car but end short of the outer ends of the members 60. The bottom flanges 65 of the members 64 are secured to the bottom plate 59.

The members 60 and 64 are secured to the vertical webs 49 of the center sill by means of a hat-section 66 which has its crown portion telescoped between and secured to the webs of the members 60 and 64, whereas its marginal flanges rest against and are secured, such as by welding, to the outside of the web 49. The outer ends of the members 60 are similarly secured by a hat-section 67 to the web of the underframe side sill 68, one of which is arranged on either side of the underframe. The side sills 68 extend from the intermediate end underframe beam 24 at the vestibule (left) end of the body to the end beam 23 at the other end (right) thereof.

A U-section member or spacer 69 is placed between and has its arm secured to the webs of the members 60, 64 at the outer ends of the members 64 on each side of the center sill. A plate 70 is secured to the bottom flanges 62 of the members 60 between the spacer 69 and the side sill 68.

A second U-section spacer 71 is arranged between the members 60, 64 at the location of longitudinal beams 72 arranged midway between the center sill 22 and the side sills 68. These beams 72 consist of telescoping outwardly facing channel-section members 73, 74 and are secured to the needle beam by hat sections 75. Similar beams (not shown) may be secured in the same fashion to cross members 28 which will be described later on.

The top flange 63 and part of the web of each member 64 is cut out adjacent the center sill so as to create an opening for the passage of wires, pipes, etc. Another U-section spacer 76 is arranged between the members 60 and 64 along the outer edge of the cut-out portion.

The cross beams 28, other than the needle beams 27, may be of similar construction as the part of the needle beams, that is, they may comprise, as shown in Figure 16, channel-section members 77, a top plate 78 extending across the center sill 26 and a bottom plate 79 which ends at the center sill on each side thereof. The transverse beams may be secured by hat-sections to the center sill 22 and the side sills 68 in a similar manner as the needle beams and also their inner reinforcements and their connection to any intermediate longitudinal beams similar to the beams 72 may be effected in a similar manner as described and illustrated in connection with the needle beams. On account of the obvious similarities, these details of the beams 28 are not illustrated.

The lower margins of the center sill are interconnected in the region of the needle beams by the latter's lower plates 59 and in other regions at appropriate distances by plates 80. Of course, the underside of the center sill 22 may be closed completely by a continuous bottom plate or by plates extending from needle beam to needle beam and to the end frames respectively.

The entire underframe structure is stiffened and additionally reinforced by a large shear web constituted by channel-section members or floor pans 81 which have their bottom walls 82 fastened to the center sill 22 and to the longitudinal beams 72 and to the inwardly directed arm 83 of the Z-section member 84 which has its other outwardly directed arm 85 secured to the inwardly directed flange or arm 86 of the side sill 68. The channel-section members have their side walls 87, 88 abutting each other. The upper margins of the side walls 87, 88 are flanged at 89 and 90, and these flanges, which are arranged at slightly different heights, overlap each other as shown in the drawing. The channel members 81 are interconnected by welding together their adjoining walls 87, and/or their overlapping flanges 89, 90. The outer ends of the members 81 fit beneath and are secured by their flanges 89, 90 to the side sill flanges 86.

The shear web constituted by the floor pans 81 extends from the offset 41 of the one end underframe 20 to the corresponding offset at the other end underframe 20.

So as to compensate for the thickness of the top walls 58, 78 of the cross beam and to make a firm connection between the top walls 30, 33 and 55 of the center sill portions and the bolster beams, spacer strips 30', 33' and 56' be provided in all regions other than the cross beams 27, 28. Other means such as offsetting the top walls of the center sill portions and/or the underside of the shear web may be used for the same purpose.

On the vestibule end, the last floor pan 81 is secured to a narrow U-section member 91 which serves together with other members for the attachment of the vestibule partition walls 92 and it is secured to the intermediate transverse beam 24 of the end underframe, see Figure 10. The end walls 92' are secured to the end beams 23.

Downwardly facing hat-sections 93 are arranged longitudinally on both sides of the longitudinal center line so as to serve as additional reinforcements and as supports for the seats (not shown). A Z-section member 94 is secured to the top of each side sill flange 86 and serves together with the web of the side sill 68 for the attachment of the side wall unit 95, part of which is shown in Figure 9 but which will not be described here in detail because it is illustrated and described at length in the application Serial No. 572,774, of the same inventors referred to hereinbefore.

Floor members or boards 96 arranged between the outer margins of the underframe structure and the longitudinal members 93 as well as between the latter are supported by the flanges 89, 90 of the floor pans and other members of the under-structure as clearly shown in the drawing. The outer removable floor strips 97 permit the connection between the inner arms of the members 94 and the side wall units, as likewise described in the aforesaid application. Insulation (not shown) is held in the floor pans 81 beneath the floor boards 96.

At the vestibule end, the floor ends, of course, at the partition wall 92 and is continued only in the central portion of the vestibule, whereas at the non-vestibule end, the floor extends in full width all the way to the end beam 23 and the end wall 92'.

The connection between the bolster beams 25 and the adjoining parts of the side wall structures 95 is illustrated in Figures 5, 12 and 13. The bottom plates 34 of the bolster beams terminate on each side shortly before their outer ends. A partition or bulkhead 98 is inserted between the side walls 32, the top wall 33 and the end of the bottom wall 34. A second vertical plate 99 is inserted between the side walls and the top wall of the bolster beam at a short distance outwardly from the bulkhead 98 so that a downwardly open-box results. Bolts 100 pass through the end plate 99 and the web of the side sill 68 as well as through walls, flanges and brackets of an adjoining post structure 101 of the side wall structure 95.

Except for the posts 101 at the bolster beams and the end posts 102, 103 connected to the end beam 23 and the intermediate transverse beam 24, the body posts may be located at any desired place irrespective of the location of the cross beams, although especially in the case of the needle beams, it will add to the strength of the structure if a continuous ring is formed by a cross beam, a pair of side wall posts 104 (Figures 5 and 14) and a (not shown) roof carline.

It will be understood that, while many figures show one half of the structure only, the structures are substantially symmetrical with respect to the vertical longitudinal center plane indicated by lines 105. Furthermore, interior partitions and equipment are for the sake of clarity, not illustrated.

While a specific embodiment of the invention has been illustrated and described, the invention is susceptible to modifications and adaptations and certain of its features may be used independently of other features. All such modifications and adaptations as well as individual features and sub-combinations are covered by the attached claims.

What is claimed is:

1. In a vehicle body underframe for railway cars, a center sill structure and a sheet metal floor panel arranged horizontally at the level of the top surface of said center sill structure, said floor panel extending over the entire width and a major portion of the length of the underframe and being structurally secured directly to said center sill structure throughout the length of the latter, transverse reinforcements on the upper side of said floor panel extending uninterruptedly across said sill structure, said floor panel with its said reinforcements being formed as a shear web as well as a transverse girder structure which extends from one longitudinal side of the body to the other for transmitting stresses between the center sill and the sides of the body.

2. Underframe for land vehicles comprising a center sill structure composed of a separately manufactured end section and a middle body section, both sections of the center sill structure extending from a level closely beneath the floor level downwardly for about the same distance, a transversely reinforced floor panel extending across the center sill section to the longitudinal sides of the underframe and being structurally secured to both center sill sections so as to form therewith a main load-carrying element of the vehicle and transmit stresses between the center sill structure and the sides of the underframe.

3. In a railway car body, a longitudinal center sill structure and a horizontal sheet metal panel reinforced on its upper side by a plurality of longitudinally spaced transverse upright webs, said panel extending over the width and at least a major portion of the length of the body and being arranged directly on top of said center sill structure, said center sill structure and said panel being rigidly and structurally connected with each other throughout their length, a longitudinal side sill structure extending along and being structurally connected to each of the side margins of said panel, said side sill structures being adapted for the attachment of side wall structures of the body, said panel and transverse webs being constructed as transverse beam structures, so as to transmit horizontal stresses between the center sill structure and the side sill structures, and as a floor support.

4. In an underframe for vehicles, such as railway cars, a center sill structure and a floor pan, the latter extending over the full width of the frame and over a major portion of the length thereof, said floor pan comprising transversely extending channel-section members structurally secured by their bottom walls to the center sill and by their side walls to each other so as to form a transversely reinforced shear web adapted to transmit stresses between the center sill and stress transmitting structures along the longitudinal sides of the body and to assist in the support of the floor load and of accessories suspended beneath the floor.

5. In a vehicle such as a railway car, a floor panel comprising channel-section members having their bottom walls substantially in one plane and having their side walls abutting and connected with each other, marginal horizontal flanges on the side walls, said bottom walls and said flanges being connected to members of a skeleton framework of the vehicle and to such elements as floor boards and seat supporting rails.

6. Transverse beam for vehicle underframes comprising a pair of U-section members having their webs arranged vertically at a horizontal distance from each other so that their arms face in opposite directions, a second pair of correspondingly arranged U-section members having their upper arms directly secured to the underside of the lower arms of the first-named members, upright spacers inserted between and secured to the webs of all said U-section members and extending across the division between the upper and the lower members, and top and bottom plates extending across and secured respectively to the top arms of the upper U-section members and the lower arms of the lower U-section members respectively.

7. Center sill for railway cars comprising two shallow U-section members arranged with their webs on edge and with their open sides facing each other leaving a space between the inner margins of their arms, a closure member extending across the space and being secured to one of the flanges of both said members, a hat-section member for each U-section member facing with its open side the web of the respective U-section member and having its flanges secured to such web, the flanges of the hat-section members ending at the side of the closure member at about the flanges to which the closure member is secured, the other flanges of the hat-section being continued each by a horizontal flange, said horizontal flanges overlapping and being secured to the other arms of the U-section members so as to constitute additional reinforcements therefor.

8. End underframe for railway cars in the form of a fabricated welded structure comprising a center sill portion and a bolster beam both of which are of closed box-sectional construction at least for part of their lengths, said center sill portion having a top wall which laterally extends far beyond its side walls but ends short of the sides of the underframe and is connected to the bolster beam and additional cross members so as to longitudinally and diagonally interbrace the sill portion, the bolster beam and the cross members.

9. Underframe for vehicles, such as railway cars comprising a pair of longitudinal side sills which are interconnected by a generally horizontal floor panel reinforced by transverse upright webs, each said side sill having two arms embracing and secured to the marginal top and bottom portions of the structure formed by said panel and said webs.

10. In a railway car, an underframe structure having a horizontal shear web extending over the width and a major portion of the length of the car and being provided with angle section transverse reinforcements, one arm of said reinforcements extending upwardly from the horizontal shear web while the other arm is arranged horizontally at a distance above the shear web, said shear web with its said angle section reinforcements constituting a main strength element of the railway car and carrying the pay load as well as accessories and said angle sections supporting a car floor.

JOSEPH LEDWINKA.
GEORGE TRAUTVETTER.

REFERENCES CITED

The following references are of record in the file of this patent:

UNITED STATES PATENTS

| Number | Name | Date |
| --- | --- | --- |
| 723,067 | Summers | Mar. 17, 1903 |
| 999,256 | Pulliam | Aug. 1, 1911 |
| 1,078,638 | Pflager | Nov. 18, 1913 |
| 1,090,174 | Sullivan et al. | Mar. 17, 1914 |
| 1,202,746 | Lindstrom | Oct. 24, 1916 |
| 1,563,091 | Kinsman | Nov. 24, 1925 |
| 1,685,104 | Thompson | Sept. 25, 1928 |
| 1,706,924 | Kane | Mar. 26, 1929 |
| 1,762,375 | Albrecht | June 10, 1930 |
| 1,804,428 | Mussey | May 12, 1931 |
| 1,938,743 | Duryea | Dec. 12, 1933 |
| 2,015,188 | Muhlfeld | Sept. 24, 1935 |
| 2,054,783 | Gilpin | Sept. 15, 1936 |
| 2,056,137 | Idoine | Sept. 29, 1936 |
| 2,082,792 | Dean | June 8, 1937 |
| 2,101,557 | Mussey et al. | Dec. 7, 1937 |
| 2,150,417 | Campbell | Mar. 14, 1939 |
| 2,171,425 | Dean et al. | Aug. 29, 1939 |
| 2,171,434 | Ragsdale et al. | Aug. 29, 1939 |
| 2,223,746 | Stoner | Dec. 3, 1940 |
| 2,309,073 | Dean | Jan. 19, 1943 |
| 2,363,197 | Nystrom et al. | Nov. 21, 1944 |